United States Patent [19]

Lentz et al.

[11] Patent Number: 4,830,258
[45] Date of Patent: May 16, 1989

[54] METHOD AND APPARATUS FOR PRODUCING A CONTAINER BODY HAVING A BUTT WELDED LONGITUDINAL SEAM FROM A SHEET METAL BLANK

[75] Inventors: Norbert Lentz; Harald Schmidt, both of Essen, Fed. Rep. of Germany

[73] Assignee: Fried. Krupp Gesellschaft mit Beschränkter Haftung, Essen, Fed. Rep. of Germany

[21] Appl. No.: 153,641

[22] Filed: Feb. 3, 1988

[30] Foreign Application Priority Data

Feb. 4, 1987 [DE] Fed. Rep. of Germany ....... 3703270

[51] Int. Cl.⁴ ..................... B23K 26/00; B23K 26/08
[52] U.S. Cl. ..................... 228/17.5; 228/17; 219/61.1; 219/61.13; 219/61.3; 219/64
[58] Field of Search .............. 228/144, 146, 151, 16, 228/17, 17.5, 50; 29/33 D; 219/61.1, 61.13, 61.3, 64

[56] References Cited

U.S. PATENT DOCUMENTS

| | | | |
|---|---|---|---|
| 1,998,139 | 4/1935 | Kurtze | 219/61.1 |
| 2,818,489 | 12/1957 | Kalning et al. | 219/61.13 |
| 4,354,090 | 10/1982 | Nilsen | 228/17.5 |
| 4,436,979 | 3/1984 | Nilsen . | |
| 4,635,841 | 1/1987 | Frei | 228/17.5 |
| 4,724,993 | 2/1988 | Gotoh | 228/17.5 |
| 4,741,468 | 5/1988 | Weil et al. | 228/16 |

FOREIGN PATENT DOCUMENTS

| | | | |
|---|---|---|---|
| 0158979 | 10/1985 | European Pat. Off. | 219/64 |
| 0217751 | 4/1987 | European Pat. Off. | 219/64 |
| 3534195 | 12/1986 | Fed. Rep. of Germany . | |
| 81-01116 | 10/1980 | PCT Int'l Appl. | 228/17.5 |

Primary Examiner—Nicholas P. Godici
Assistant Examiner—Samuel M. Heinrich
Attorney, Agent, or Firm—Spencer & Frank

[57] ABSTRACT

To make a container with a butt welded longitudinal seam, the side edges of a preformed blank are guided by straight grooves so that the side edges converge at an acute angle. At the point of convergence the side edges are heated to at least to the forging temperature, preferably by a focused laser beam. The side edges are then tangentially compressed before they cool.

13 Claims, 7 Drawing Sheets

METHOD AND APPARATUS FOR PRODUCING A CONTAINER BODY HAVING A BUTT WELDED LONGITUDINAL SEAM FROM A SHEET METAL BLANK

BACKGROUND OF THE INVENTION

The present invention relates to a method of producing a container body having a butt welded longitudinal seam from a sheet metal blank, the blank being preformed in such a manner that its side edges are spaced uniformly from one another over its entire length, and are each at the same distance from the axis of the finished container. The invention also relates to an apparatus for performing the method, the aparatus being of the type which includes an outer guide arrangement; an upper guide rail having two lateral guide grooves, both at the same height, which—when seen in the direction of advance—at the beginning lie slightly above the final shape of the finished container and, at the end, lie at the level of the final shape of the container, the grooves having bottoms which—in the horizontal plane—are spaced from one another such that the value existing at the start of the guide rail steadily decreases toward its end; and a heat source disposed downstream of the guide rail, when seen in the direction of advance.

U.S. Pat. No. 4,354,090 discloses an apparatus for producing container bodies having a butt welded longitudinal seam, in which the side edges of the sheet metal blanks are held by external rollers and are guided during their advance in lateral longitudinal grooves of a so called Z-bar. Two guide grooves—when seen in the direction of advance of the blanks—adapt themselves from different heights to a common height. The groove bottoms of the guide grooves extend over the entire length of the Z-bar, each time to a common center plane. Since the respective pieces of the container body reach their final shape upon leaving the Z-bar, the side edges, caused by the external rollers, lie flush against one another and are then subjected to the influence of heat from a laser source. Since the side edges already lie against one another over a certain length when the thermal energy is applied, there occurs merely a fusion or sublimation welding process in which the material is heated to the melting phase or to the vapor phase, and flows off in part as metal vapor within the "vapor channel" formed in the joining groove. The vapor condenses at the already hardened weld seam and finally hardens to form a weld seam. At higher welding rates or more than about 0.5 m/s, this may produce turbulences in the melt and thus irregularities in the weld seam.

U.S. Pat. No. 4,635,841 discloses another device for producing container bodies having a butt welded longitudinal seams. The guide rail of this device is provided with two guide grooves of identical height for the side edges of the sheet metal blanks. Seen from the side, these guide grooves follow a path which is increasingly curved downwardly. The groove bottoms are spaced from one another by an amount which decreases steadily from a finite value at the beginning of the guide rail to almost zero at the end of the guide rail. According to the teaching of U.S. Pat. No. 4,635,841, the side edges of the blanks are to lie against one another, due to the geometric relationships after leaving the guide rail following the initial contact, along the entire section after leaving the guide rail between the end of the rail and the welding location. Here again, the section of the blank leaving the guide rail obviously has already attained its final geometric shape before the actual joining process, and there occurs a fusion or sublimation welding process with the already mentioned drawbacks.

SUMMARY OF THE INVENTION

It is an object of the invention to provide a method of the above-mentioned type in which the welding velocity can be increased while simultaneously avoiding faulty welds. Moreover, an apparatus is to be provided for implementing the method.

Insofar as the method is concerned, this is accomplished in that a container blank is positively guided when advanced in the direction of the geometric axis of the finished container; in that the side edges of the blank—initially as a whole and after contact at their leading points in the direction of advance, the sections which are still spaced apart from one another—converge in a straight line at an acute angle at a point on their imaginary extensions; in that the side edges, at the point where they converge, are brought by the influence of heat to at least the forging temperature; and in that before the side edges cool to the solidification temperature, they are tangentially pressed together by the positive guidances, which still continues. Heating of the side edges at the point where they converge to at least the forging temperature, and the simultaneous tangential compression as a result of an externally applied force, produce an intimate bond between the edge regions. Depending on the contact pressure, a larger or smaller portion of the doughy or liquid material is pressed outwardly, thus causing the theoretical diameter of the finished can body to be somewhat smaller than the width of the sheet metal blank. It was found, surprisingly, that blanks having slight irregularities in their side edges can also be processed, with an excess dimension (for example, arcuate) which may exist in part contributing to more of the molten material being pressed out. Advantageously, the acute angle at which the side edges approach one another is selected to be so small that the changes in the shape of the material produced in the transition region remain in the elastic range.

The apparatus for implementing the method is distinguished in that the guide rail has an associated inner guide tool whose outer contour does not change in the direction of advance and corresponds to the lower portion of the inner contour of the finished container; in that the outer guide arrangement— when seen in the direction of advance—extends at least to the point of intersection of the straight lines given by the groove bottoms; and in that the axis of the heat source is oriented toward the intersection of the straight lines given by the groove bottoms. The fact that the outer contour of the internal guide tool is identical with the lower portion of the inner contour of the finished container keeps the preformed blank as a whole from taking on a frustoconical shape, which could cause problems when it is changed to the cylindrical shape. When the heat source is added, the individual points of the side edges are continuously brought together from a finite distance to a distance of zero. To weld the side edges at the point where they converge, the axis of a heat source, preferably an optical device which focuses a laser beam, is directed to the point of the lines defined by the intersection of the groove bottoms of the guide rail.

To increase the required external force and produce a defined shape, a calibrating tool is disposed at the height of the point of intersection of the lines defined by the groove bottoms. Considering the time required to heat the edge regions, the effective plane of the calibrating tool is advantageously disposed immediately behind this point of intersection.

To reduce friction and prevent the inner surface of the can body from being scratched, the inner guide tool is preferably composed of individual rods which can easily be exchanged—for example to change the guide length or in the case of wear—and can be adjusted, if required.

Pairs of transporting rollers are preferably provided on either side of the point of intersection to eliminate the need for a chain advance in this region. The first pair of transporting rollers is simultaneously able to roll flat any possible burrs in the side edges so that the latter can be abutted easily in a flush manner.

A slide skid is preferably provided to bring the side edges together in a flush state and a counter tool is preferably provided below the slide skid. The skid has a recess to permit free access of the thermal energy to the point of welding. The skid is preferably adjustable in height and inclination to accommodate various sheet metal thickness and container cross sections.

The second pair of transporting rollers rolls over the still-hot butt weld and flattens any weld peaks and burrs produced by the mashing together of the side edges, thus smoothing butt welded seam.

DESCRIPTION OF THE PREFERRED EMBODIMENT

Figure 1:
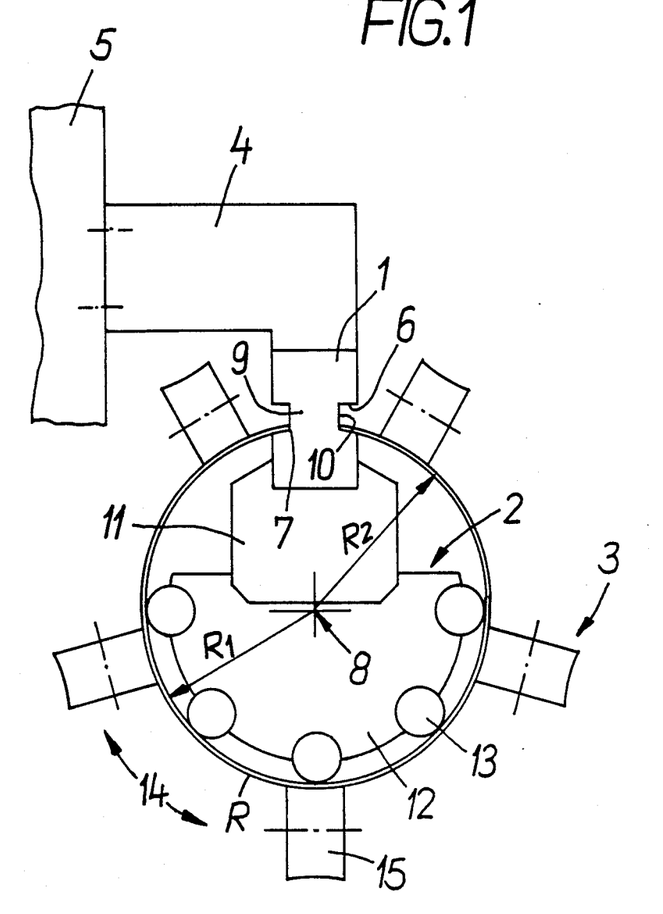
FIG. 1 is an end view of a device for producing a container having a butt welded longitudinal seam from a sheet metal blank in accordance with the invention.
Figure 2:
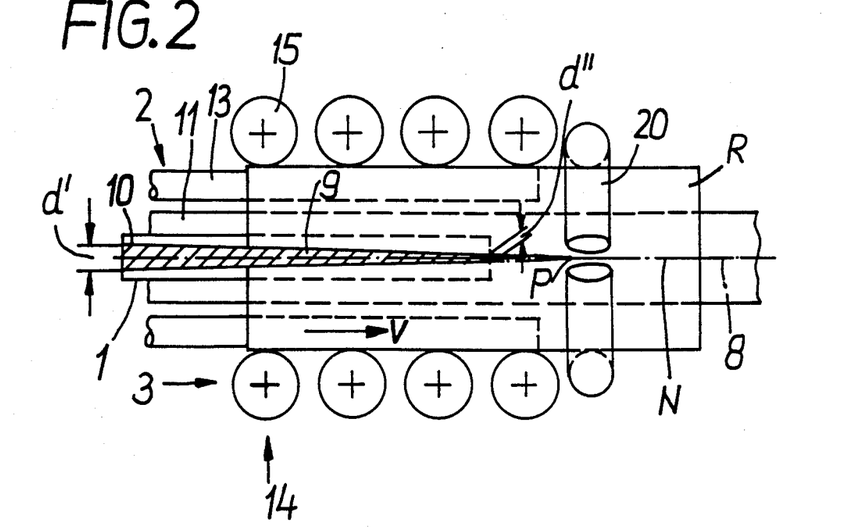
FIG. 2 is a top view of the device, partially in section, with the outer guide rollers being shown only in the horizontal position for the sake of simplicity.
Figure 3:
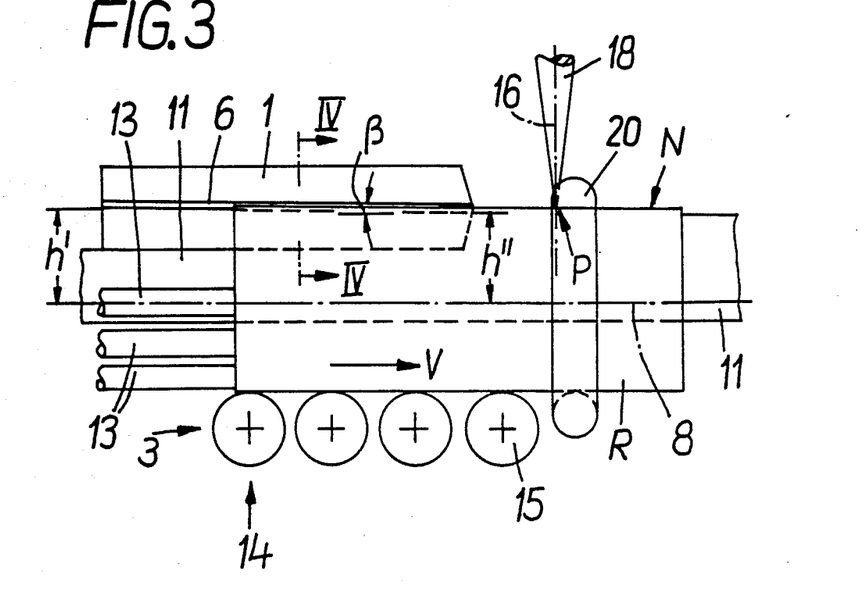
FIG. 3 is a simplified front view of the device, with the outer guide rollers being shown only in the vertical position.

With reference first to FIGS. 1 to 3, an apparatus according to the present invention includes a guide rail 1, an inner guide tool 2, and an outer guiding arrangement or outer guide tool 3.

Guide rail 1 is fastened to machine frame 5 by means of a supporting arm 4. Guide rail 1 has two lateral guide grooves 6 at the same height which extend in straight lines. At the beginning or rear end of the guide rail 1, grooves 6 have a height $h'$, which is the height of the geometric axis 8 of the finished container or can body R and which is higher than the corresponding height $h''$ at the forward end of guide rail 1. Guide grooves 6 are thus inclined at an angle $\beta$ with respect to the geometric axis 8 of the finished container—when seen in the direction of advance V. Guide grooves 6 form a wedge 9, shown in hatching in FIG. 2 between the upper part and the lower part of guide rail 1. Wedge 9 has a thickness $d'$ at the beginning and a thickness $d''$ at the end of the guide rail 1. The linear extensions or axes of the groove bottoms 10, and thus the sides of the wedge 9, converge at an imaginary geometric point P in front of guide rail 1.

A lower arm 11 is fastened at the bottom of guide rail 1, and the inner guide tool 2 is fastened to lower arm 11. Inner guide tool 2 is composed of mutually parallel guide rods or bars 13 which are releasably fastened to transverse supports 12. The outer contour of rods 13 as a whole corresponds to the inner contour of the lower portion of the finished container body R.

The outer guide tool 3 is composed of individual rings 14 of rollers arranged one behind the other, with their individual rollers 15 being arranged around inner guide tool 2. Rollers 15 have circumferential faces that are adapted to the outer contour of container body R. Such roller rings are known per se and are disclosed, for example, in U.S. Pat. No. 4,354,090.

Figure 5:
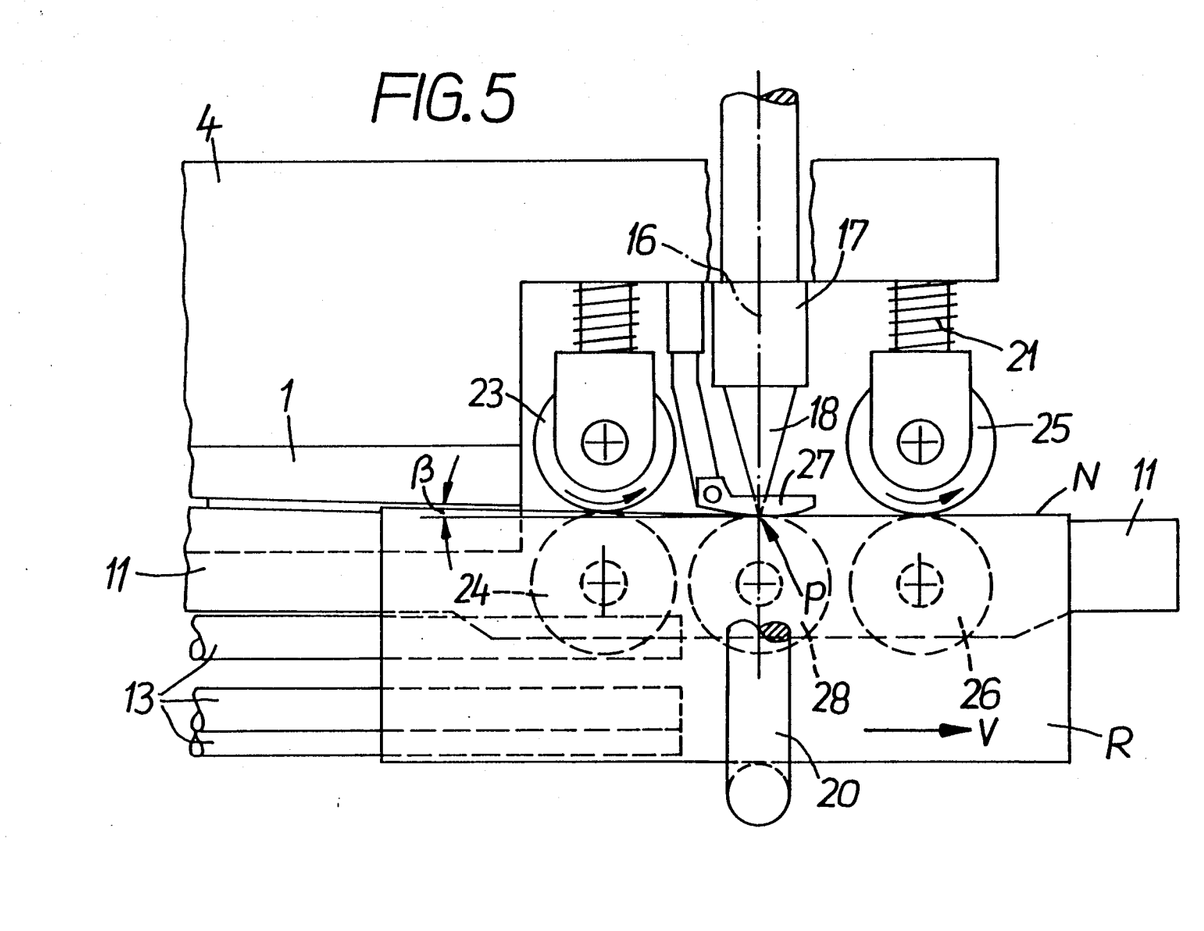
FIG. 5 is a front view of a laser welding head.
Figure 7:
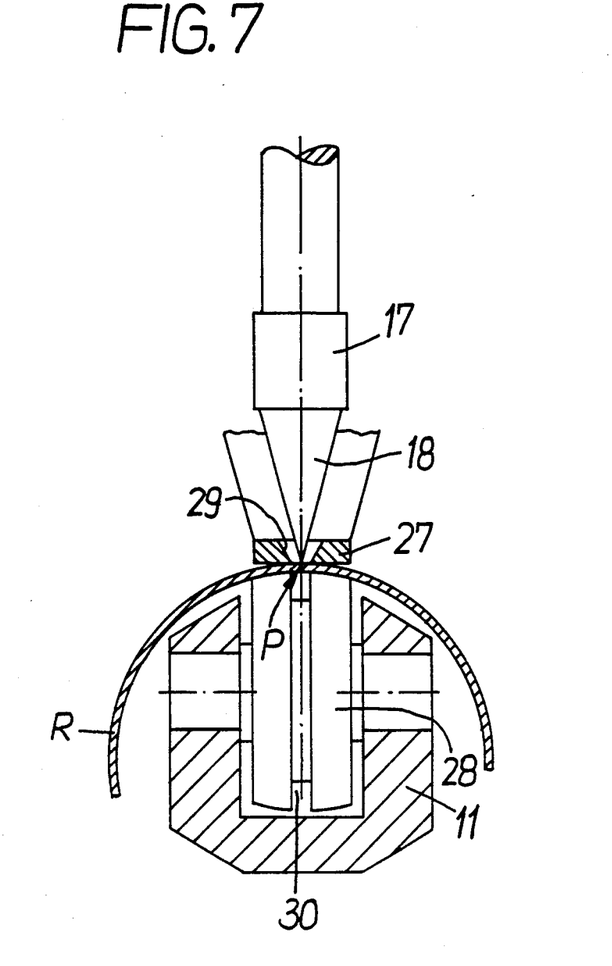
FIG. 7 is a cross-sectional detail view through the axis of the laser beam showing the laser welding head.
Figure 8:
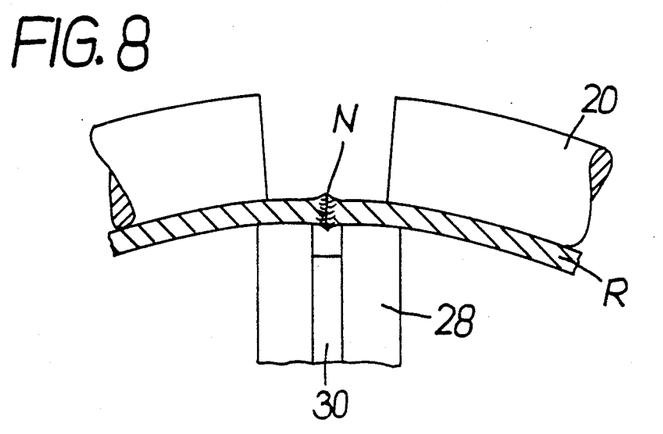
FIG. 8 is a cross-sectional detail view of the apparatus taken at the plane of the calibrating tool.

With reference next to FIGS. 3, 5 and 7, the axis 16 of an optical device 17 for focusing a laser beam 18 is oriented toward the point of intersection P given by the (imaginary) extensions or axes of the groove bottoms 10 of guide rail 1.

With reference next to FIGS. 2, 3, 5 and 8, following the rings 14 of rollers 15, there is provided a calibrating tool 20 in the form of a calibrating ring open at the top. The inner diameter of calibrating tool 20 corresponds to the outer diameter of the finished container body, and the effective plane defined by the inner diameter of calibrating tool 20 is disposed at or directly behind the point of intersection P given by the linear extensions of the groove bottoms 10, i.e. in a range of 0 to 1 mm behind that point of intersection P.

In modification of the calibration ring shown in the Figures, the calibrating tool 20 may alternatively be configured as a corresponding set of rollers (not shown).

Figure 6:
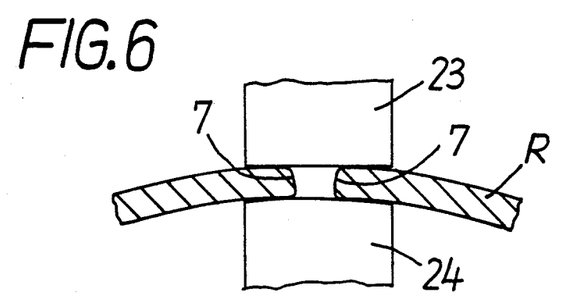
FIG. 6 is a cross-sectional detail view taken at the pair of transporting rollers lying upstream of the heating position when seen in the feed direction.
Figure 9:
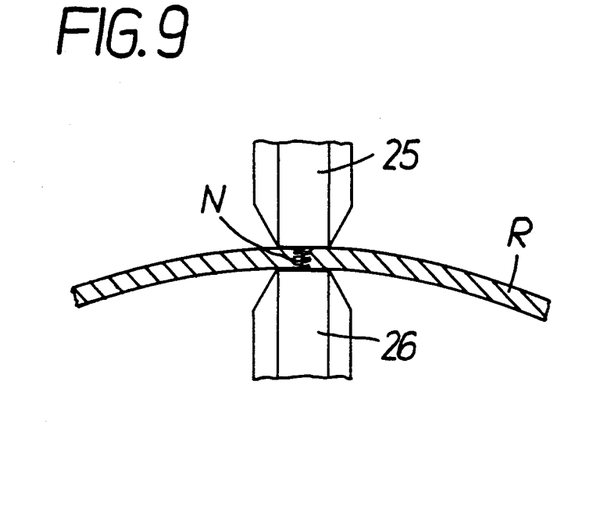
FIG. 9 is a cross-sectional detail view taken at the pair of transporting rollers which lies downstream of the axis of heat introduction.
Figure 11:
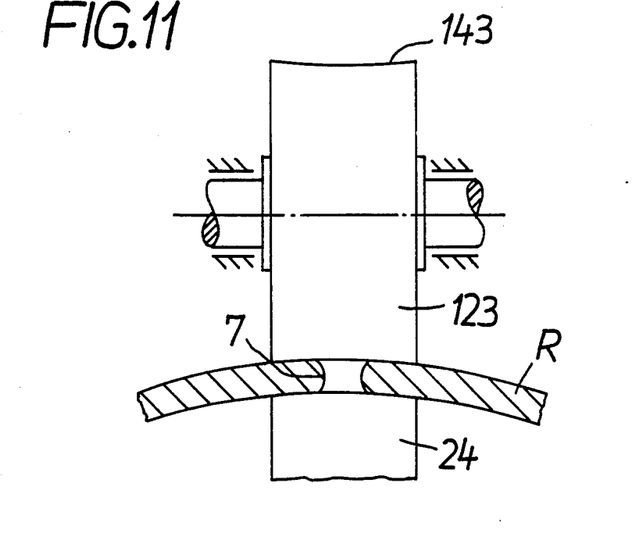
FIG. 11 is a detail view taken at the pair of transporting rollers lying upstream of the heating position when seen in the feed direction, partially in cross-section, the circumferential faces of the rollers having a concave contour.
Figure 12:
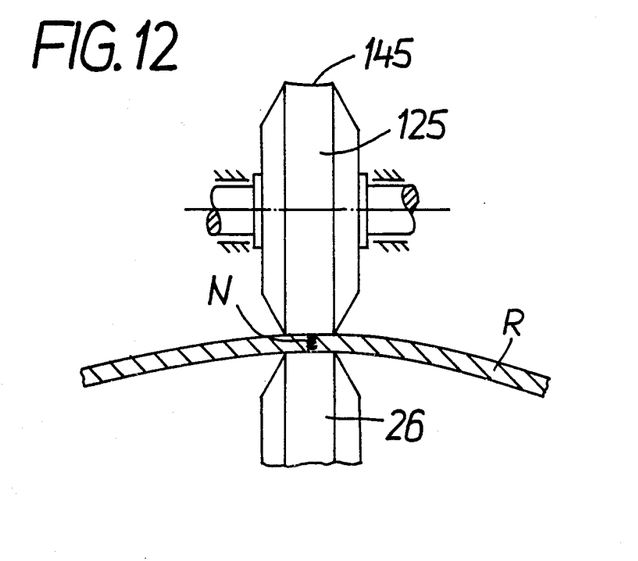
FIG. 12 is a detail view taken at the pair of transporting rollers which lies downstream of the axis of heat introduction, partially in cross section, the circumferential faces of the rollers having a concave contour.

With reference next to FIGS. 5, 6 and 9, between the end of guide rail 1 and point of intersection P, there is disposed a first pair of transporting rollers 23 and 24, and behind the point of intersection P there is a second pair of transporting rollers 25 and 26. The lower rollers 24 and 26 are mounted in lower arm 11 so as to be freely rotatable. The upper rollers 23 and 25 are connected with a drive (not shown) and biassed by springs 21 to press them toward the lower rollers 24 and 26, respectively. The lower or inner rollers 24 and 26 have circumferential faces which are adapted to the inner contour of the finished container body R. The spring biassed upper and outer rollers 23 and 25 have cylindrical circumferential faces. However, in modification of this embodiment, the circumferential faces 143, 145 of the outer rollers 123 and 125 may also be adapted to the outer contour of the finished container bodies R and may, for example, be concave as illustrated in FIGS. 11 and 12.

Figure 4:
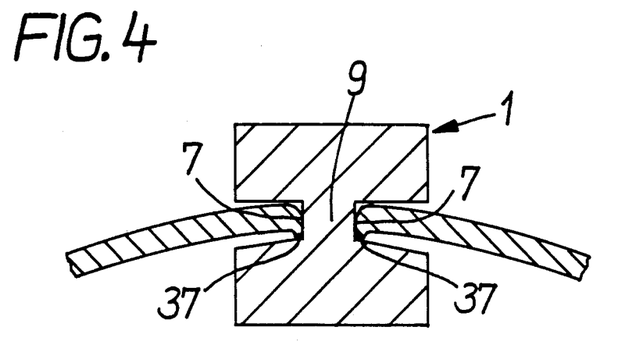
FIG. 4 is a sectional view of the guide rail, taken along line IV—IV of FIG. 3, with the side edges of the blank resting in the bottoms of the grooves.

In order to be able to bring the sections of side edges 7 (see FIG. 4) of container body R, which have been compressed by outer guide tool 2, directly into the range of influence of the heat exactly in the vertical direction, a slide skid 27 is disposed below the optical device 17. Below this a counter roller 28 is mounted in lower arm 11 so as to be freely rotatable. Slide skid 27 is provided with a recess 29 to give the laser beam free access to the weld location. Counter roller 28 is provided with a circumferential groove 30 (see FIG. 7).

Figure 10:
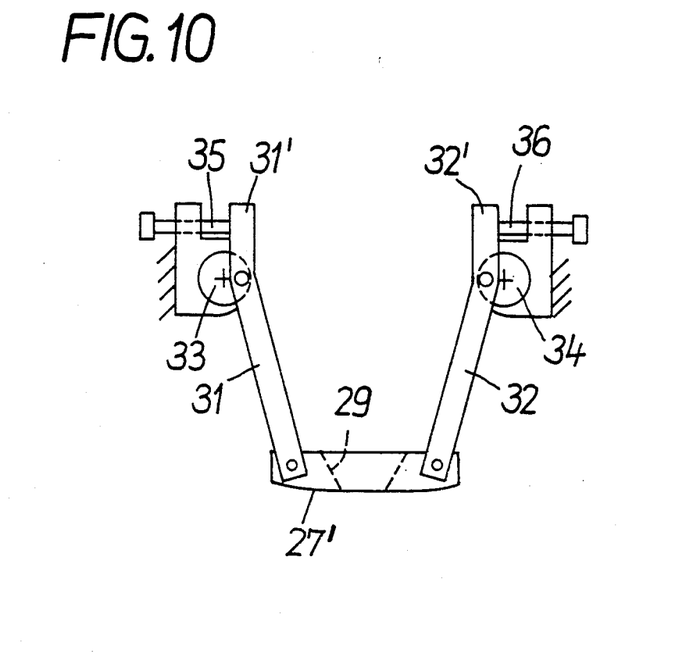
FIG. 10 is a simplified side view of another embodiment of the suspension system for slide skid.

In a special embodiment shown in FIG. 10, slide skid 27' is articulated to two levers or arms 31 and 32 which, in turn, are mounted at an eccentric element 33 and 34, respectively. If the left eccentric element 33 is turned counterclockwise, for example, the left side of slide skid 27' is raised. If the right eccentric element 34 is rotated counterclockwise, for example, the right side of slide skid 27' is lowered, so that slide skid 27' as a whole—when seen in the direction of advance V (see FIG. 5)—is inclined. Individual rotation of eccentric elements 33 and 34, moreover, permits slide skid 27' to be lowered or raised even if it is oriented horizontally, or it may be inclined opposite to the direction of advance. The levers or arms 31 and 32 are provided with extensions 31' and 32', which can be engaged by set screws 35 and 36. To set slide skid 27' into the desired position, set screws 35 and 36 are initially turned back, enabling levers 31 and 32 to move. After the setting, set screws 35 and 36 are again screwed toward extensions 31' and 32'.

Preformed sheet metal blanks or container bodies R are rounded by a conventional rolling and bending machine (not shown) and are transferred axially in succession into an intermediate guide (not shown). From the intermediate guide they reach a position between the inner guide tool 2 and the outer guide tool 3, with side edges 7 being pressed by outer guide tool 3 into groove bottoms 10 of guide grooves 6 of guide rail 1. While the lower portion of a preformed container body R already has its final shape over the entire length of inner guide tool 2, such shape being given by the radius R1 (see FIG. 1), a mean radius R2 results for the upper portion of the preformed container body R. This radius R2 is a function of the width of wedge 9 and thus a function of the movement of the container body R along the feed path. While the lower half of the preformed container body R is moved exactly horizontally, the upper half with side edges 7 runs onto a slight slope in grooves 6 in the direction toward the geometric axis 8 of the finished container body, and the spacing of the side edges 7 is reduced in correspondence with the shape of wedge 9 of guide rail 1. The reduction increases up to the weld location. At the weld location, side edges 7 are brought together so that a continuous, circular shape with a constant radius R1 results downstream of the weld location. In the same manner as the tangential bringing together of side edges 7 by way of reductions in the diameter of the upper portion of container body R, the regions of the side edges which the laser beam has converted into a doughy or fusible state are combined into a butt mash welded seam N (see FIG. 8). This means that the finished shape of the container body is not yet reached at the point of impingement of laser beam 18, which point is identical with the point of first contact of side edges 7 or point of intersection P, but only shortly thereafter. The compression force required for the tangential mashing of the butt welded seam and thus for a reduction of the diameter, which force is to be directed onto the side edge portions to be welded together, arises because the preformed container body R passes through the calibration tool 20, whose inner diameter corresponds to the outer diameter of the finished container body after pressure welding.

Circumferential groove 30 (see FIG. 8) of roller 28 is configured so that the projecting mashing burr of seam N is able to protrude. Furthermore, the depth of circumferential groove 30 is such that, where no sheet metal is present above roller 28, laser beam 18 hits the bottom of the groove 30 in a defocused state, so that the energy density is low.

To transport the preformed container bodies R, a transporting chain conveyor of known configuration (not shown) is used. The chain conveyor and/or the transporting roller pairs 23, 24 and 25, 26 push and pull the container bodies R under laser beam 18 at a constant speed. The first pair of rollers 23 and 24 flattens any possibly existing cutting burrs 37 (see FIG. 4) on side edges 7, and the still hot butt welded seam N is smoothed by the second pair of rollers 25 and 26.

The rolling of side edges 7 by the first pair of rollers 23 and 24 facilities the flush abutment of the side edges 7. This occurs between slide skid 27 and counter roller 28, with slide skid 27 being adjustable in height and slope to meet the technological requirements.

The present disclosure relates to the subject matter disclosed in Federal Republic of Germany application P 37 03 270.4, filed Feb. 4th, 1987, the entire disclosure of which is incorporated herein by reference.

It will be understood that the above description of the present invention is susceptible to various modifications, changes and adaptations, and the same are intended to be comprehended within the meaning and range of equivalents of the appended claims.

What we claim is:

1. An apparatus for making a container body having a butt welded longitudinal seam from a sheet metal blank having a forward end and a pair of side edges, the blank being curled about a center so that the edges are directed toward one another and spaced apart, comprising:
    first means for guiding the blank to advance the blank along a path forward-end-first, the first means including an inner guide tool around which the blank extends, the inner guide tool having an outer contour which does not change in the direction of advance of the path and which includes a portion that conforms to the contour of the finished container, the portion of the inner guide tool that conforms to the contour of the finished container being remote from the side edges of the blank, the first means additionally including an outer guide arrangement disposed around the blank, the outer guide arrangement having a forward end;
    second means for urging the side edges together, so that the side edges move toward each other as a whole until the side edges come into initial contact at a point of convergence positioned adjacent the forward end of the blank, with the side edges being spaced apart behind the point of convergence and disposed along respective substantially straight lines, and so that after the initial contact the portions of the side edges which are still spaced apart converge at an acute angle as the blank advances along the path to move the point of convergence away from the forward end of the blank, the second means including an elongated guide rail associated with the inner guide tool, the guide rail having a rear end, a forward end, and a pair of sides extending between the ends, each side having a respective linear groove with a groove bottom which has a groove bottom axis, the grooves lying in a common plane which is slightly skewed with respect to the path, with the distance between the center of the blank and the grooves at the rear end of the guide rail being slightly greater than the distance between the center of the blank and the grooves at the forward end of the guide rail, the distance between the groove bottom axis of one groove bottom and the groove bottom axis of the other groove bottom steadily decreasing from the rear end of the guide rail to the front end of the guide rail, the bottom of one groove being spaced apart from the bottom of the other groove at the forward end of the guide rail by a predetermined distance, the groove bottom axes intersecting at a predetermined point in front of the forward end of the guide rail, the predetermined point corresponding substantially to the point of convergence; and third means for heating the edges of the blank at the point of convergence to at least the forging temperature, the third means including a heat source having a heating axis which is directed toward the predetermined point, wherein the outer guide arrangement of the first means additionally includes fourth means for tangentially pressing the side edges together before the side edges cool to the solidification temperature.

2. The apparatus of claim 1, wherein the heat source of the third means comprises means for focussing a laser beam toward the predetermined point.

3. The apparatus of claim 1, wherein the fourth means comprises a calibrating tool having an inner contour, a portion of the inner contour conforming to the outer contour of the finished container, whereby the effective plane of said calibrating tool defined by said inner contour is disposed at or directly behind the predetermined point.

4. The apparatus of claim 1, wherein the inner guide tool of the first means comprises rods which extend parallel to the path.

5. The apparatus of claim 1, wherein the first means further comprises two pairs of transporting rollers, the predetermined point being disposed between the pairs.

6. The apparatus of claim 5, wherein each pair of transporting rollers includes an outer roller which is disposed outside the blank and an inner roller which is disposed inside the blank, and wherein for each pair of transporting rollers the first means further comprises means for urging the respective outer roller toward the blank, means for driving the respective outer roller, and means for mounting the respective inner roller so that the respective inner roller is freely rotatable.

7. The apparatus of claim 5, wherein each pair of transporting rollers includes an inner roller which is disposed inside the blank, each inner roller having a circumferential face which conforms to the contour of the finished container.

8. The apparatus of claim 5, wherein each pair of transporting rollers includes an outer roller which is disposed outside the blank, each outer roller having a cylindrical circumferential face.

9. The apparatus of claim 5, wherein each pair of transporting rollers includes an outer roller which is disposed outside the blank, each outer roller having a circumferential face which conforms to the outer contour of the finished container.

10. The apparatus of claim 1, further comprising an outer slide skid having a passage, the slide skid being disposed outside the blank and positioned so that the heating axis extends through the passage of the slide skid, and an inner counter tool disposed inside the blank.

11. The apparatus of claim 10, wherein the inner counter tool comprises a freely rotatable roller having a circumferential groove.

12. The apparatus of claim 10, wherein the slide skid has an inclination which is adjustable.

13. The apparatus of claim 10, wherein the slide skid has a height which is adjustable.

* * * * *